United States Patent [15] 3,702,447
Koning [45] Nov. 7, 1972

[54] ELECTRONIC CHOPPER SYSTEM FOR USE IN FACSIMILE COMMUNICATION COMPRISING MEANS FOR ALTERNATELY GROUNDING AND UNGROUNDING INPUTS OF AMPLIFIER

[72] Inventor: Virgil H. Koning, Henrietta, N.Y.
[73] Assignee: Xerox Corporation, Rochester, N.Y.

[22] Filed: July 1, 1968
[21] Appl. No.: 741,537

[52] U.S. Cl. ....................332/3, 178/7.1, 250/209, 250/214 R, 250/219 Q
[51] Int. Cl...............H03c, H04n 3/16, H01j 39/12
[58] Field of Search...........250/219 I, 209, 210, 214; 330/29, 38 FE; 332/3; 178/7.1

[56] References Cited

UNITED STATES PATENTS

| | | | |
|---|---|---|---|
| 2,873,312 | 2/1959 | Moe | 250/214 X |
| 2,907,887 | 10/1959 | Beck | 250/214 |
| 3,014,135 | 12/1961 | Hewlett et al. | 250/214 X |
| 3,229,218 | 1/1966 | Sickles et al. | 330/29 |
| 3,368,157 | 2/1968 | Fumea, Jr. et al. | 330/38 FE |
| 2,506,384 | 5/1950 | Rich | 250/209 |
| 2,967,279 | 1/1961 | Beck | 332/3 |

*Primary Examiner*—James W. Lawrence
*Assistant Examiner*—T. N. Grigsby
*Attorney*—James J. Ralabate, Franklyn C. Weiss and John E. Beck

[57] ABSTRACT

An electronic chopper circuit for use in converting variable amplitude direct current signals to pulsed signals of similar characteristics. In conjunction with a facsimile scanning system, the modulated electrical signals generated by a photoelectric cell are applied to a differential amplifier after periodic interruption by the electronic chopping circuit in accordance with an input clock signal. The periodic interruption to the differential amplifier is provided by a dual emitter transistor which alternately grounds and ungrounds the input to the differential amplifier in response to an input clock signal. The gain of the differential amplifier is controlled by a field effect transistor which is operated as a variable resistor in response to a control voltage generated in response to the background level detected on a document. The output therefrom is a series of signal pulses, the heights of which are in direct relation to the level of the input signals.

10 Claims, 4 Drawing Figures

INVENTOR.
VIRGIL H. KONING
BY
Franklyn C. Weiss
ATTORNEY

ELECTRONIC CHOPPER SYSTEM FOR USE IN FACSIMILE COMMUNICATION COMPRISING MEANS FOR ALTERNATELY GROUNDING AND UNGROUNDING INPUTS OF AMPLIFIER

BACKGROUND

Facsimile systems are well known in the art for transmitting information on a document to a remote location for creation of a facsimile thereat of said document. One such prior art system utilizes an optical scanner for scanning transversely across a document or the like with a light beam to convert the information on the document to information modulated light beams. This light is impinged upon a photoelectric cell, which is used to convert the information modulated light beam into electrical signals which can be subsequently utilized for various modulation and encoding techniques for transmission to a similar facsimile system at a remote location.

In order to more effectively utilize the information modulated light beam reflected from the document, prior art facsimile systems have utilized what are termed mechanical choppers. One such mechanical chopper is a rotating disc with apertures selectively placed around the periphery of the disc so as to interrupt the light beam eminating from the document in a predetermined orderly fashion. The light falling upon the photocell is then in discrete light pulses which are, accordingly, converted to electrical pulses in accordance therewith. The output electrical signals are now proportional to the information modulated light impinging upon the photocell but are now in electrical pulse form which can be more readily utilized by a subsequent encoder or modulator, commonly termed in the art as a modem.

Such prior art mechanical choppers are deficient, however, in that additional drive and mechanical connections are necessary for the proper movement of the mechanical chopper in the path of the information modulated light beam. As an aperture passes in front of the light beam, an increasing amount of light passes through until the full aperture is in the path of the light beam and then the amount of light begins to decrease as the aperture moves away from the path of the light beam. Impinging upon the photocell, therefore, are not crisp interruptions of the light beam but varying degrees of intensity of light which are allowed to pass by the movement of the apertures. The output from the photocell, accordingly, is not a train of crisp electrical signals but varying electrical signals in accordance with the varying input light beam.

Mechanical choppers have, therefore, given away to electronic choppers. Such electronic choppers can be more precise in the generation of the information pulses in that the information modulated light is allowed to continuously impinge upon the photocell, but the electrical output therefrom is modified more exactly by electronic means. One such chopper amplifier is noted in the General Engineering Memo No. 10 as published by the National Semiconductor Corporation in Danbury, Connecticut. Such prior art electronic choppers, however, have given no thought to application to facsimile systems and related functions therein.

OBJECTS

It is another object of the present invention to provide an electronic chopping circuit in conjunction with other circuit components for the generation of a control voltage to control the amplification of said circuit in accordance with the varying background levels on documents to be transmitted in a facsimile communication system.

BRIEF SUMMARY OF THE INVENTION

In accomplishing the above and other desired aspects of the present invention, Applicant has invented improved apparatus for providing electronic chopping of video signals in a facsimile communication system. A differential amplifier is utilized in conjunction with a photoelectric cell and a dual emitter transistor. A clock signal provided to the dual emitter transistor alternately grounds and ungrounds the inputs to the differential amplifier. Across one input to the differential amplifier is the photoelectric cell upon which the information modulated light beams are impinged. Upon alternate half periods of the clock signal applied to the dual emitter transistor, the differential amplifier amplifies the electrical signals generated by the photocell in accordance with the information modulated light beam.

The gain of the differential amplifier is controlled by a field effect transistor which is operating in a linear portion of the drain current versus drain to source voltage relationship. In the linear range thereof, the field effect transistor is accordingly operated as a variable resistor. Controlling the field effect transistor is a control voltage generated in response to the background level detected on a document. That is, when the facsimile scanner is scanning through a white document with black printing thereon, the gain of the differential amplifier can be attenuated for subsequent circuit operation. When, however, the document scans through a colored document or portions of a document where the background may be darker than the rest of the document, the gain of the amplifier is adjusted accordingly in order to detect the information that may be printed on this colored area instead of detecting the change in background as actual information. The output signal from these circuits is now the chopped electrical signal modulated in accordance with the information detected on the document. This signal is then passed through a buffer stage to provide source impedance to subsequent circuits.

DESCRIPTION OF THE DRAWINGS

For a more complete understanding of the invention, reference may be had to the following detailed description in conjunction with the drawings wherein.

DETAILED DESCRIPTION OF THE INVENTION

Figure 1:
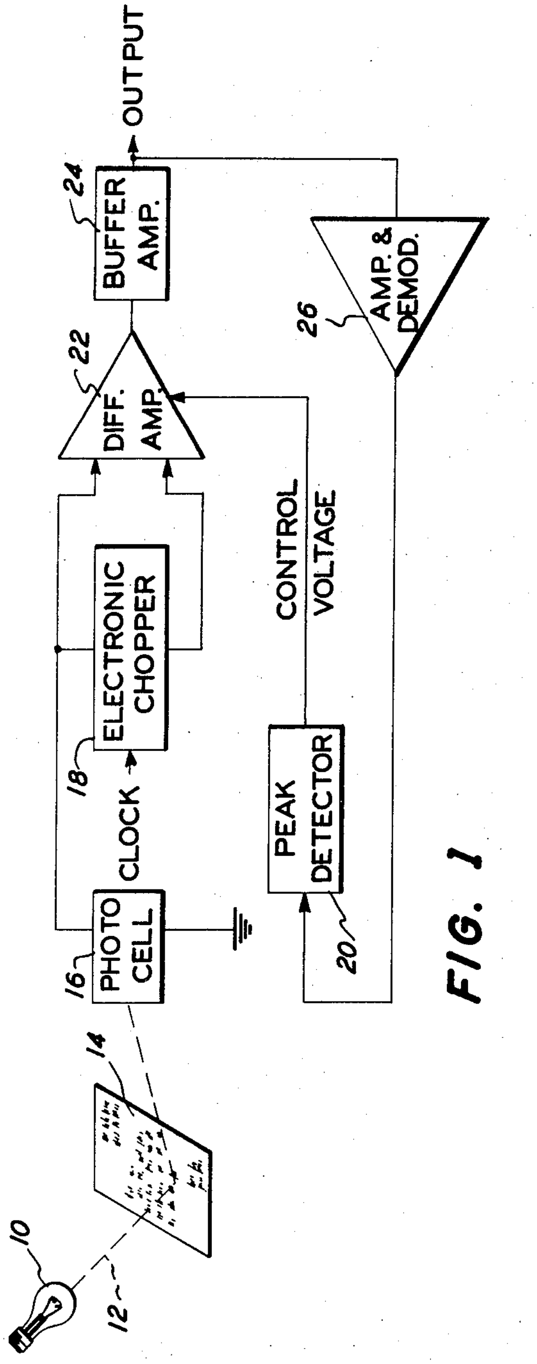
FIG. 1 is a block diagram of a facsimile system utilizing the present invention.
Figure 3:
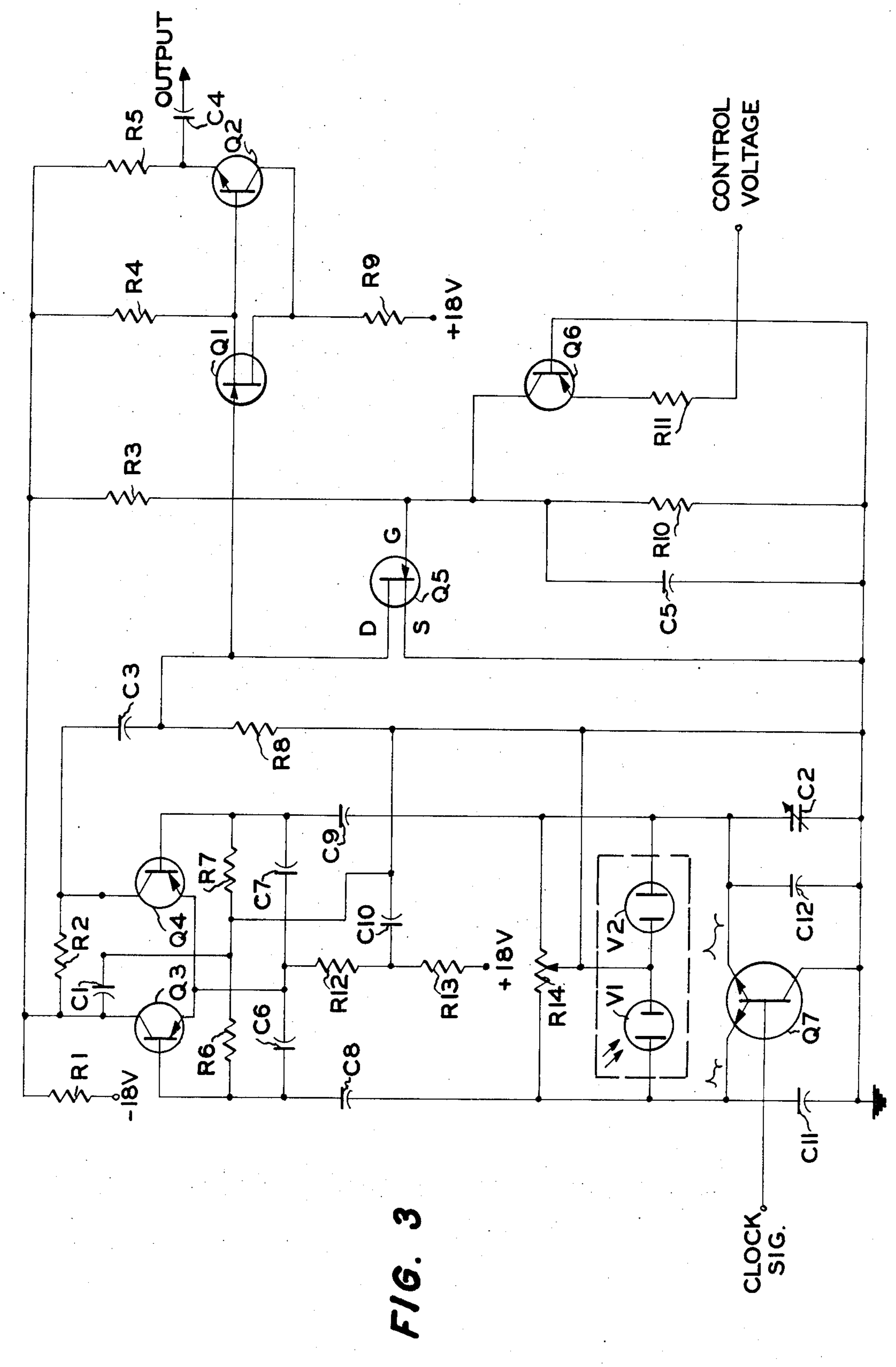
FIG. 3 is a schematic diagram of the electronic chopper circuit in accordance with the principles of the present invention.

Referring now to FIG. 1, shown therein is a block diagram of the system represented schematically in FIG. 3. Optical scanner unit 10, of any known design, would scan a document or the like 14 in any of the known prior art manners. Light beam 12 would be reflected from the document onto photocell 16. The photocell 16 generates electrical signals in accordance with the received information modulated light beam. The output from photocell 16 is coupled to a differential amplifier 22. Connected across the inputs to the differential amplifier 22 is the electronic chopper circuit 18. In response to an input clock signal, the electronic chopper circuit 18 alternately is grounded the two inputs to the differential amplifier 22. When the differential amplifier 22 is grounded, no signal is amplified through the amplifier, which is, in effect, disabled. When, however, the electronic chopper circuit is in the off state by reason of the clock signal, the grounds are removed from the inputs to of the clock signal, is removed from the differential amplifier 22 and the electrical output from photocell 16 is amplified by the differential amplifier 22. The output is thus an amplified signal comprising electrical pulses in direct relation to the DC signal generated by the photocell 16, which in turn is in direct relation to the information detected on document 14.

The peak detector 20 in FIG. 1 detects the peak signal at the output of buffer amplifier 24 and amplified and demodulated by circuit 26 over a predetermined time interval of the signal generated by photocell 16. If the background of the document 14 is all white, the signal generated by photocell 16 will be at a maximum. If, however, a darker background document is detected, the peak signal of such background detected by photocell 16 will no longer be at a maximum. In this instance, therefore, the gain of the differential amplifier 22 must be increased in order to adequately distinguish between the background and the actual information detected on the document 14. To take an example, if it is assumed that a +7 voltage is an all black signal while a zero voltage indicates all white, with various shades of gray therebetween, when a darker background is detected the peak signal instead of being zero volts may range anywhere from zero to +7 volts. As the peak signal, by definition for this example, is zero volts, the peak detector 20 detects only such median signals between zero and +7 volts as the background voltage. Thus, if the peak background voltage level is, for instance, 2 volts, the peak detector generates a control voltage for application to the differential amplifier 22 to increase its gain to overcome the effect of such darker background. Thus, in this situation, as far as the differential amplifier 22 is concerned, the dark background will be considered as white in order to distinguish from the actual information detected on document 14. The signal generated now by differential amplifier 22 is coupled to buffer amplifier 24 for impedance matching and gain to the output circuits coupled thereto.

Figure 2A:
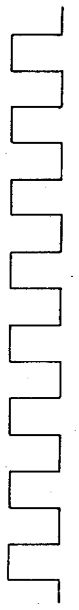
FIGS. 2*a* and 2*b* are representative waveforms helpful in understanding the present invention.
Figure 2B:
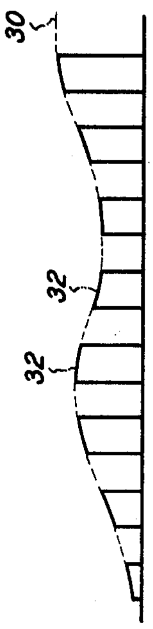

In FIGS. 2*a* and 2*b* is shown representative curves which are of interest in the operation of the circuit in FIGS. 1 and 3. FIG. 2*a* shows the clock signals which are the input signals applied to the electronic chopper 18. The clock signals are shown to be symmetrical with respect to the zero axis, but these signals are exemplary only as any variable clock signals could be utilized to give the desired pulse rate of the output signal. FIG. 2*b* shows the shape of the signal 30 generated by the photocell 16. Depending upon the intensity of the light beam modulated by the information on the document 14, the output from the photocell 16 will be a varying wave taking the shape 30, for example, as a varying amplitude D.C. signal. Superimposed thereon are the pulses 32 which are generated by the electronic chopper and differential amplifier as seen in FIG. 1. The amplitudes of the signals 30 and 32 are shown to be the same, but in actual operation of the circuit in FIG. 1, the signals 32 will be of a higher amplitude due to the amplification by the differential amplifier 22 and the buffer amplifier 24. In addition, the relative amplitudes of the signals in FIG. 2*a* and FIG. 2*b* have no meaning except for the face that they are shown to be similar for convenience of illustration.

FIG. 3 shows the actual circuit of the invention depicted in the block diagram of FIG. 1. For comparison with FIG. 1, it can be seen that photocell 16 is photocell V1 in FIG. 3; electronic chopper 18 is dual emitter transistor Q7; differential amplifier 22 comprises transistors Q3 and Q4 with associated resistors and capacitors; and buffer amplifier 24 comprises transistors Q1 and Q2.

The circuit operates when the information modulated light is received at photocell V1 and the clock signal is received at the base of dual emitter transistor Q7. By alternately enabling and disabling the transistor Q7, the path across the emitters of the transistor alternately are ungrounded and grounded respectively. The emitters of the transistor Q7 are coupled to the inputs of the differential amplifier through capacitors C8 and C9. In a case where the emitters of transistor Q7 form a direct short circuit across the input of the differential amplifier, the differential amplifier input is at ground and is unable to amplify any input signals. When the transistor Q7 is disabled, however, the differential amplifier is capable of amplifying the signals coupled to it and thus photocell V1 applies its signal output to one input of the differential amplifier. Due to the fact that in this condition the inputs to the differential amplifier are no longer the same, the differential amplifier functions and amplifies the signal fed thereto. As the signal from photocell V1 is applied to the differential amplifier on the trailing edge of the clock signal, the output from the differential amplifier is an amplified signal in pulse form in direct relation to the intensity of the light impinging upon the photocell V1.

Due to the fact that the clock signal applied to the base of transistor Q7 is a sharp rising and falling signal, the internal capacitance of the transistor Q7 effectively differentiates the edges of the clock signal and forms transients on the output emitters of transistor Q7. However, both outputs from the emitters of transistor Q7 are applied to both inputs of the differential amplifier and since the transient signals are nearly the same due to capacitors C11 and C12 and adjustable capacitor C2, inputs to the differential amplifier see the same signal. The differential amplifier amplifies the difference between these signals which results in no signal at the output. R14 is an adjustable rheostat placed so as to balance the gain of transistors Q3 and Q4 in the differential amplifier. As is capacitor C2, the adjustment of resistor R14 is normally done only once, being necessitated only when the circuit components are joined together for the first time, as when the circuit is built. Resistor R13 applies the +18 volts to the differential amplifier while the resistor R1 applies the −18 volts potential also to the differential amplifier and the rest of the circuit. Resistors R6, R7, and R12 are internal resistances of the differential amplifier; while capacitors C1, C6, C7, and C10 are the normal capacitors for the operation of this particular differential amplifier and its function.

Photocell V2 is inserted in the circuit only for temperature compensation. No light, modulated or not, is impinged upon photocell V2 at any time. Its insertion in the circuit allows for compensation of the difference in characteristics of photocell V1 in change of temperature. If photocell V2 was not in the circuit, any change in characteristics of photocell V1 would be amplified by differential amplifier 22 inasmuch as the differential amplifier amplifies the difference between the signal values on its two inputs. Thus, if photocells V1 and V2 are of similar characteristic, any change therein due to temperature change would appear accordingly at both inputs to the differential amplifier, and accordingly, by unaffected thereby.

The output of the differential amplifier appears across resistor R2. Effectively in parallel with resistor R2 is resistor R8, the parallel combination of which determines the output impedance of the differential amplifier. Across the resistor R8 can be seen field effect transistor Q5 with the drain, source, and gate electrodes. Transistor Q5 is operated in linear region of the drain current to drain to source voltage relationship of the field effect transistor. Controlling the operation of the transistor Q5 is the control voltage, which as shown in FIG. 3, is applied to the gate of transistor Q5 through coupling transistor Q6. Resistors R10 and R3 and capacitor C5 are the load components for the operation of transistor Q6. When the document being scanned contains darker areas than the rest of the document or is of a darker background color throughout the document, the control voltage generated by the peak detector 20 in FIG. 1, is applied to the emitter of transistor Q6. If, for instance, the control voltage varies between zero and +6 volts on the emitter of transistor Q6, the voltage appearing on the output collector of the transistor will vary between zero and −6 volts. This voltage applied to the gate of transistor Q5 changes the current carrying capability of the drain to source connection of the transistor Q5 in a linear manner. Its linear relationship at lower potentials allows the field effect transistor to be an electronically controlled variable resistor. This variable resistance in parallel with resistor R8 allows the control of the output impedance of the differential amplifier comprising transistors Q3 and Q4, thereby controlling the gain of the differential amplifier. Thus, when the dark background document or the document with dark areas thereon is scanned, the gain of the differential amplifier is controlled as such so as to fully allow for the detection of all the information on the document.

The output of the differential amplifier now appearing across resistor R8 and transistor Q5 is applied to field effect transistor Q1. The transistor Q1 is connected in a source follower mode, thereby presenting to the differential amplifier a high impedance and thus is not a load on the differential amplifier. The output of the transistor Q1 at its source electrode is applied to the base of transistor Q2 which is operating as an emitter follower and, therefore, presents a low impedance output for subsequent circuit operation. Resistors R3, R4, and R5 and resistor R9 are utilized for coupling to the power supplies. Capacitor C4 is an output capacitor utilized for D.C. isolation from subsequent circuits.

The above discussion was drawn to a facsimile system and the application thereto of the electronic chopper. The invention may be incorporated into such a facsimile system utilizing any of the known optical or mechanical-optical scanners. For a description of a dual emitter transistor of the type referred to above, attention is again drawn to the General Engineering Memo No. 10 distributed by the National Semiconductor Corporation. One skilled in the art, however, may use two conventional bipolar transistors instead. It is further understood that various changes may be made and equivalents may be substituted for elements thereof without departing from the true spirit and scope of the invention. In addition, many modifications may be made to adapt a particular situation to the principles of the invention without departing from its essential teachings.

What is claimed is:

1. An electronic chopping system comprising:

means for generating a first electric signal of varying amplitude, amplifier means coupled to said generating means for amplifying said first electric signal, pulse generating means coupled to the input of said amplifier for generating pulses of predetermined duration and frequency, said pulses alternately grounding and ungrounding the input to said amplifier means, whereby the output of said amplifier means comprises varying amplitude pulses in direct relation to said first electric signal of varying amplitude, and circuit means coupled to the output of said amplifier means and responsive to a control voltage to change the load impedance of said amplifier means for controlling the gain thereof.

2. The electronic chopping system as set forth in claim 1 wherein said first electric signal generating means comprises a photocell for receiving information modulated light beams indicative of information on a document or the like.

3. The electronic chopping system as set forth in claim 2 wherein said amplifier means comprises a differential amplifier with first and second inputs, said photocell being coupled to said first input.

4. The electronic chopping system as set forth in claim 3 further including a second photocell coupled to the second input to said amplifier means for providing temperature compensation, said second photocell being prevented from receiving any beams of said information modulated light.

5. In a facsimile transmission system including optical scanning means for scanning a document or the like with a beam of light, an electronic chopping system comprising:

photodetection means for receiving the information modulated light from said document or the like and generating an electrical signal in accordance therewith, differential amplifier means with first and second inputs coupled to said photodetection means at said first input thereof for amplifying said electrical signal, and pulse generating means coupled to said first and second inputs of said differential amplifier means for alternately grounding and ungrounding the inputs to said differential amplifier means, the output of said differential amplifier means being amplified pulses in direct relation to the electrical signal applied thereto.

6. The electronic chopping system as set forth in claim 5 further including means coupled to said photodetection means for generating a control voltage indicative of the background level on said document or the like, said control voltage being applied to said differential amplifier means to control the gain thereof in proportion to the background level on said document.

7. The electronic chopping system as set forth in claim 6 further including a second photodetection means coupled to the second input of said differential amplifier means for providing stabilization due to temperature change effects on said first mentioned photodetection means.

8. The electronic chopping system as set forth in claim 7 wherein said pulse generating means comprises a dual emitter transistor responsive to a clock signal of predetermined duration and frequency.

9. The electronic chopping system as set forth in claim 8 further including a field effect transistor coupled to the output of said differential amplifier means and responsive to said control voltage generated in accordance with the background level to change the load impedance of said differential amplifier means for controlling the gain thereof.

10. The electronic chopping system as set forth in claim 6 wherein said control voltage generating means comprises a peak detection means for detecting the peak amplitude signal generated by said photodetection means and generating a control voltage in direct relation to the difference between the detected peak amplitude signal and the maximum amplitude signal capable of being generated by said photodetection means, said maximum amplitude signal being generated when the background on said document or the like is detected as white.

* * * * *